United States Patent [19]

Mikada et al.

[11] Patent Number: 5,235,476
[45] Date of Patent: Aug. 10, 1993

[54] APPARATUS FOR CONTROLLING MOVING SPEED OF MAGNETIC HEAD

[75] Inventors: Masako Mikada; Hiroshi Suzuki, both of Tokyo, Japan

[73] Assignee: Kabushiki Kaisha Toshiba, Kawasaki, Japan

[21] Appl. No.: 723,421

[22] Filed: Jun. 28, 1991

[30] Foreign Application Priority Data

Jun. 29, 1990 [JP] Japan .................. 2-173075

[51] Int. Cl.$^5$ .................................. H02P 1/22
[52] U.S. Cl. ...................... 360/73.08; 360/73.01; 360/73.04; 360/73.05
[58] Field of Search ............ 360/73.01, 73.04, 73.05, 360/73.08

[56] References Cited

U.S. PATENT DOCUMENTS

| | | | |
|---|---|---|---|
| 4,532,561 | 6/1985 | Kimura et al. | 360/73.01 |
| 4,794,469 | 12/1988 | Kaido et al. | 360/46 |
| 5,032,938 | 7/1991 | Tajima et al. | 360/73.04 |
| 5,103,348 | 4/1992 | Sasho et al. | 360/73.08 |

*Primary Examiner*—William L. Sikes
*Assistant Examiner*—Scott A. Ouellette
*Attorney, Agent, or Firm*—Finnegan, Henderson, Farabow, Garrett & Dunner

[57] ABSTRACT

In an apparatus for controlling a moving speed of a magnetic head, servo data recorded beforehand on a recording medium is read out in sequence by the magnetic head while the magnetic head is moving. Position data indicative of the current position of the magnetic head is acquired on the basis of the read-out servo data and then a moving speed of the magnetic head is computed from the position data. When the remaining distance from the current position to the target track is less than a predetermined number of tracks, the speed of the magnetic head is so controlled that the rate of change in the target speed gradually decreases. The control gain is changed in accordance with the rate of change in the target speed.

11 Claims, 11 Drawing Sheets

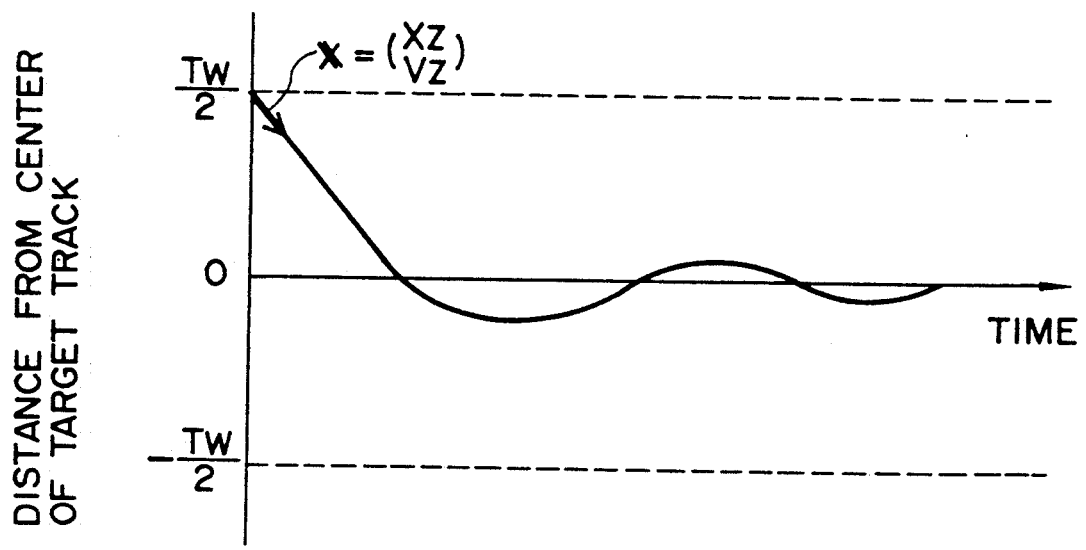
F I G. 3
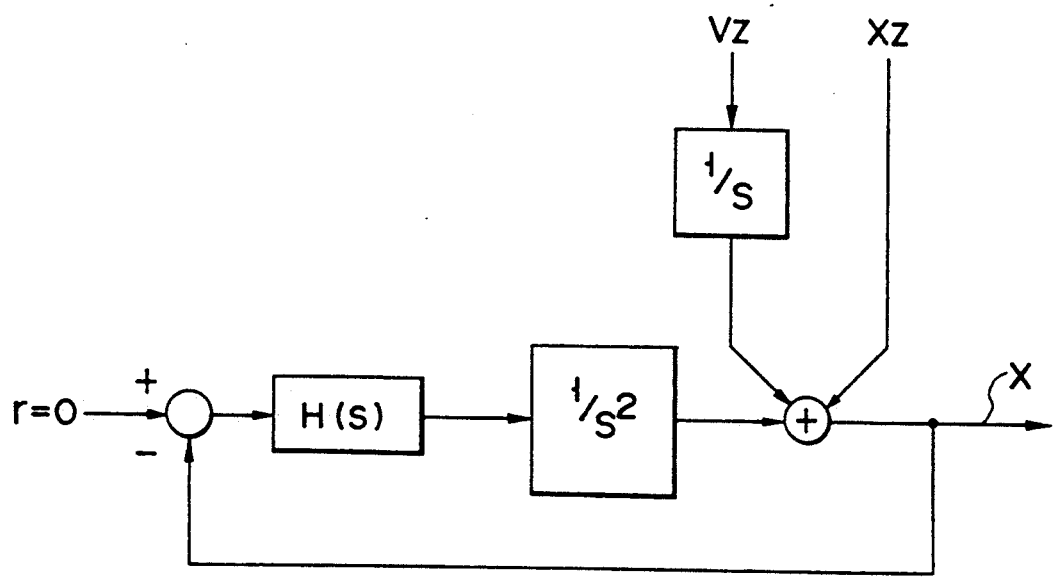
F I G. 4

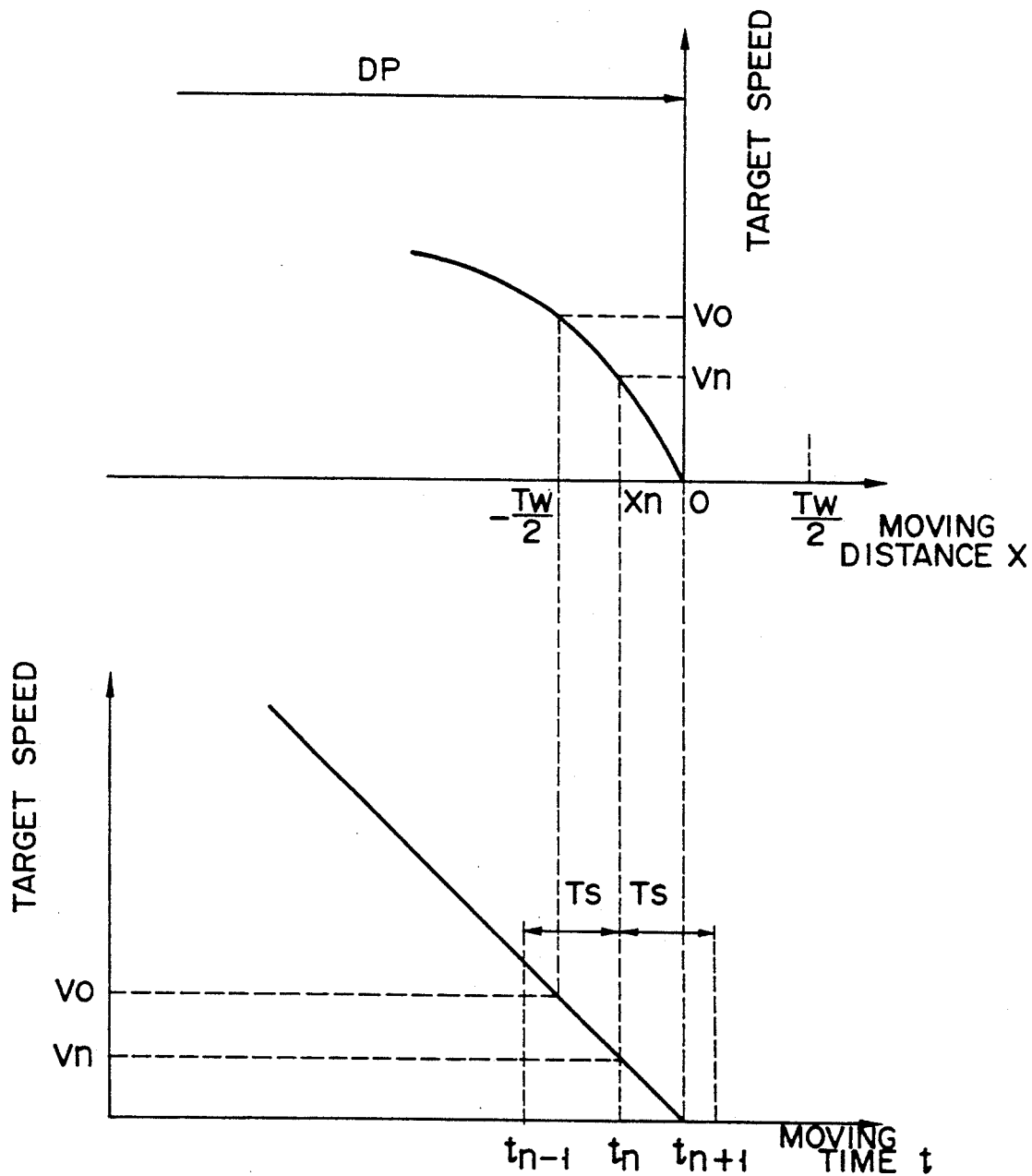
F I G. 5

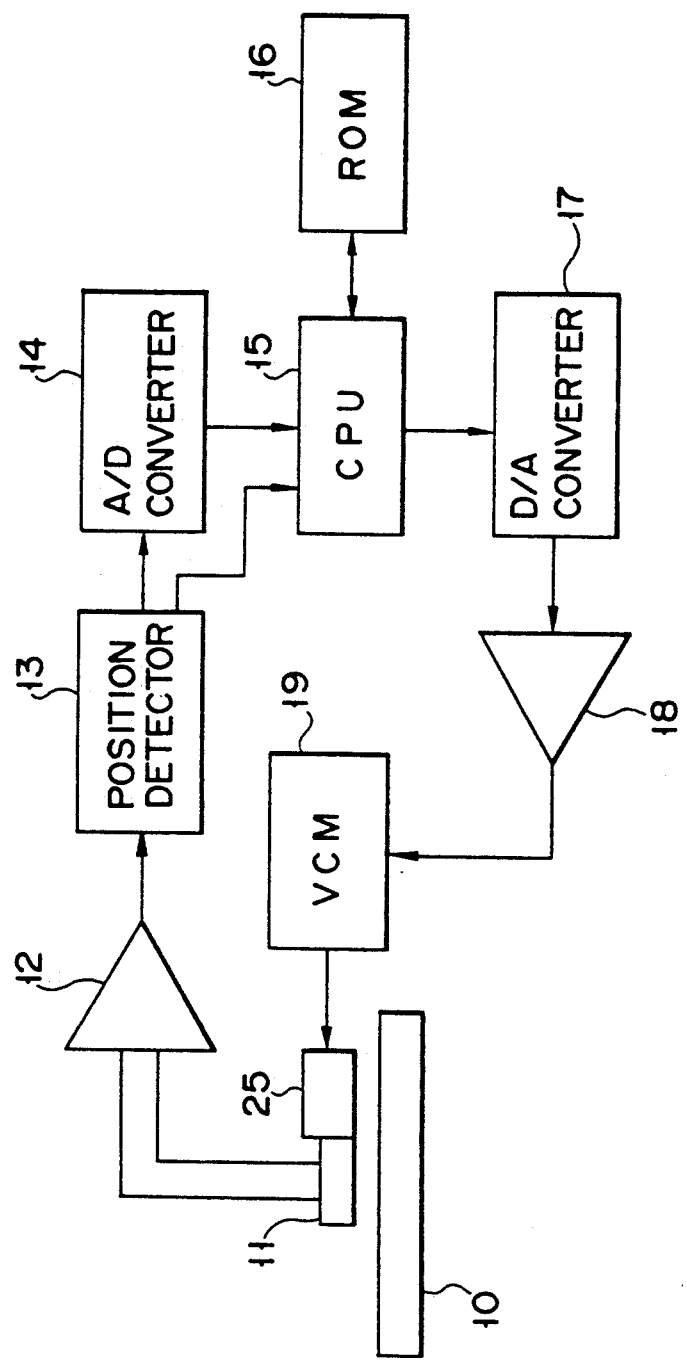
F I G. 14

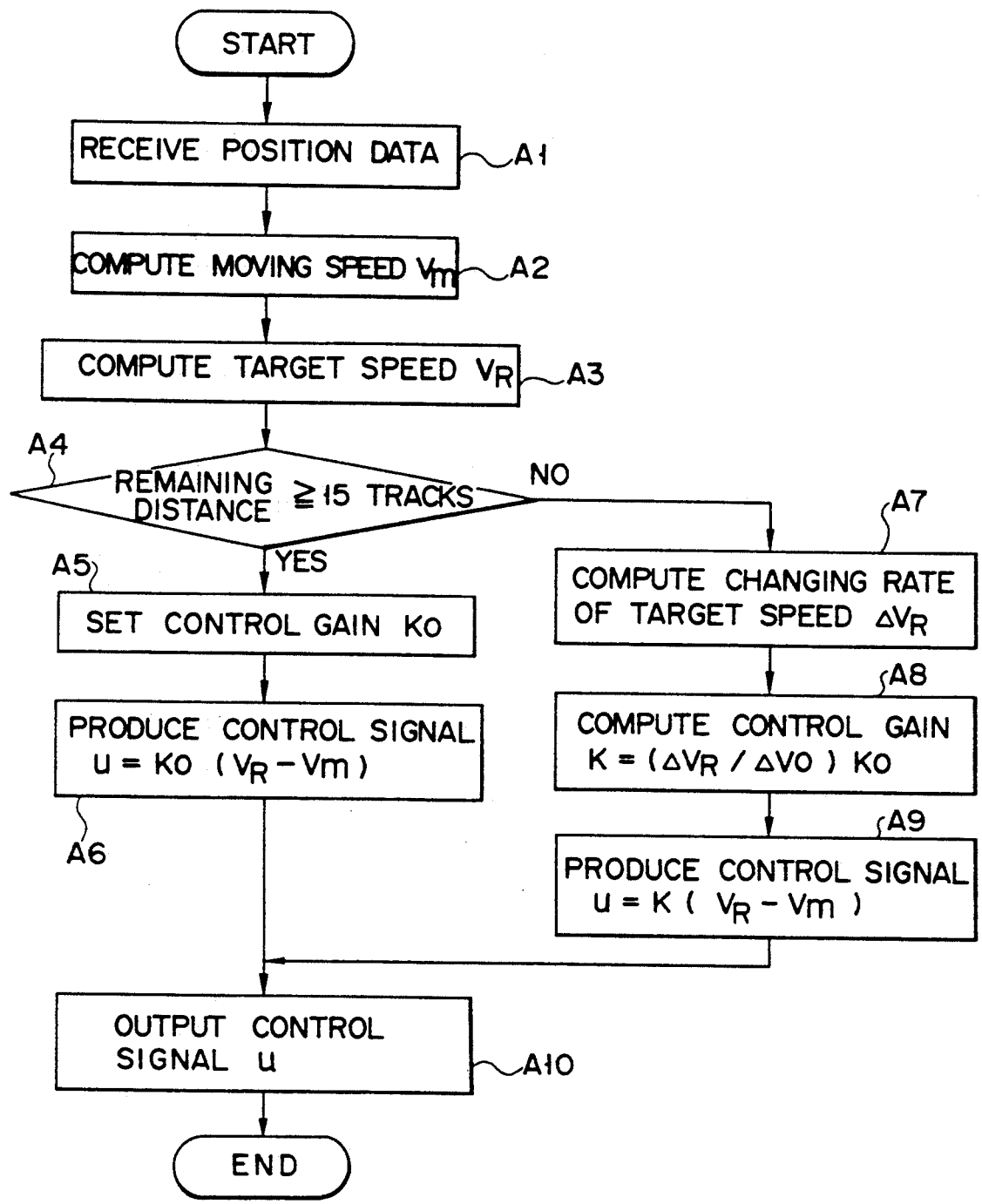
F I G. 15

APPARATUS FOR CONTROLLING MOVING SPEED OF MAGNETIC HEAD

BACKGROUND OF THE INVENTION

1. Field of the Invention

The present invention relates to an apparatus for controlling a moving speed of a magnetic head.

2. Description of the Related Art

Access control for moving a magnetic head of a magnetic disk apparatus to a target track and track following control for positioning the magnetic head in the center of the target track have conventionally been used as positioning control of the magnetic head. The access control is also called speed control since a moving speed of the magnetic head is controlled.

In the speed control, a target speed corresponding to a distance by which the magnetic head moves to the target track, is preset to make the actual moving speed of the magnetic head coincident with the preset target speed.

For example, the speed control in a hard disk drive of a sector servo type will be described below. Note that a magnetic disk as a magnetic recording medium is formatted to use the hard disk drive of the sector servo type. That is, upper and lower surfaces of the magnetic disk correspond to a data record surface in which information is recorded. Tracks in which information is recorded at concentric circles are assigned to each data record surface, and each of the tracks has a plurality of sectors. Each of the sectors has a servo area for prerecording servo information for positioning a magnetic head and a data area for reading and writing data by a user. In the servo data, track address information representing an absolute position of a track on which the magnetic head exists, and burst information for positioning the magnetic head on the center of the tracks are prerecorded. After the burst information is read out from the magnetic disk by the magnetic head, an analog signal corresponding to a shift distance between the center of the track and a position of the magnetic head is obtained by signal processing. A voltage value of the analog signal represents a shift amount of the magnetic head, and the polarity of the analog signal represents a shift direction. The burst information is used in a track following control of the magnetic head. Note that detail description about the burst information for positioning the magnetic head refers to, for example, U.S. Pat. No. 4,794,469.

The track address information is used in the speed control of the magnetic head. That is, during the magnetic head moves toward the target track, a distance which the magnetic head has moved can be obtained from first track address information read out from a sector of a track on the magnetic disk which the magnetic head exists and second track address information read out before a desired period of time from the time which the first track address information is read out. A moving speed of the magnetic head is obtained by operation from the moving distance and a time difference between the read out two track address information.

In a hard disk drive of such sector servo type, track address information as position data of the magnetic head and the moving speed of the magnetic head can be obtained only discretely. That is, these data can be acquired only every one sector time. Note that one sector time is defined as a value obtained by dividing a time required to one revolution of the magnetic disk into the number of the sectors per one track. The one sector time corresponds to sample timing of the track address information. Therefore, the position and moving speed of the magnetic head which has reached a target track are greatly varied with sample timing of the servo data by the magnetic head. That is, when track address information can be read out from a servo area of a sector of a target track by the magnetic head and when it can be detected that the magnetic head has reached the target track, the position (a distance which the magnetic head is shifted from the center of the target track) and moving speed of the magnetic head are greatly varied.

In the actual speed control of the hard disk drive of the sector servo type, initial values of the position (a distance which the magnetic head is shifted from the center of the target track) and moving speed of the magnetic head in the track following control are greatly varied. The movement of the magnetic head thus becomes unstable in the track following control and the positioning of the magnetic head on the center of the target track requires a long time.

It is therefore desirable to provide an apparatus for controlling a moving speed of a magnetic head in which the magnetic head is stably moved to the target track and its moving time is shortened by preventing a variation in the position and moving speed of the magnetic head which has reached to the target track.

SUMMARY OF THE INVENTION

It is an object of the present invention to provide a apparatus for controlling a moving speed of a magnetic head.

According to the present invention, there is provided a magnetic recording and reproducing apparatus comprising: a recording medium in which servo data is recorded; head means for reading out the servo data from the recording medium; moving means for moving the head means over the recording medium; generating means for generating position data representing a current position of the head means in accordance with the read out servo data; and control and process means for obtaining a moving speed of the head means in accordance with the generated position data, obtaining a target speed corresponding a remaining distance between a target position and the current position of the head means in accordance with the generated position data, subtracting the moving speed from the target speed to acquire a difference speed, obtaining a changing rate of successive target speeds, changing the target speed by a desired timing to change the changing rate, changing a control gain in accordance with the changing rate, and producing a control signal by the acquired difference speed and the changed gain, and wherein the moving means is controlled in accordance with the produced control signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing a transient response in track following control;

FIG. 4 is a view showing a model of the transient response shown in FIG. 3;

FIG. 5 is a graph showing the relationship between the target speed and the moving distance/moving time of the magnetic head which moves to a target track during a deceleration period of the magnetic head;

FIG. 14 is a block diagram showing a configuration of a moving speed control apparatus according to a first embodiment corresponding to the speed control model shown in FIG. 13;

FIG. 15 is a flowchart showing a first operation of the moving speed control apparatus shown in FIG. 14;

DETAILED DESCRIPTION OF THE PREFERRED EMBODIMENTS

A problem of positioning control of a magnetic head will be described before describing the embodiments of the present invention.

Figure 1:
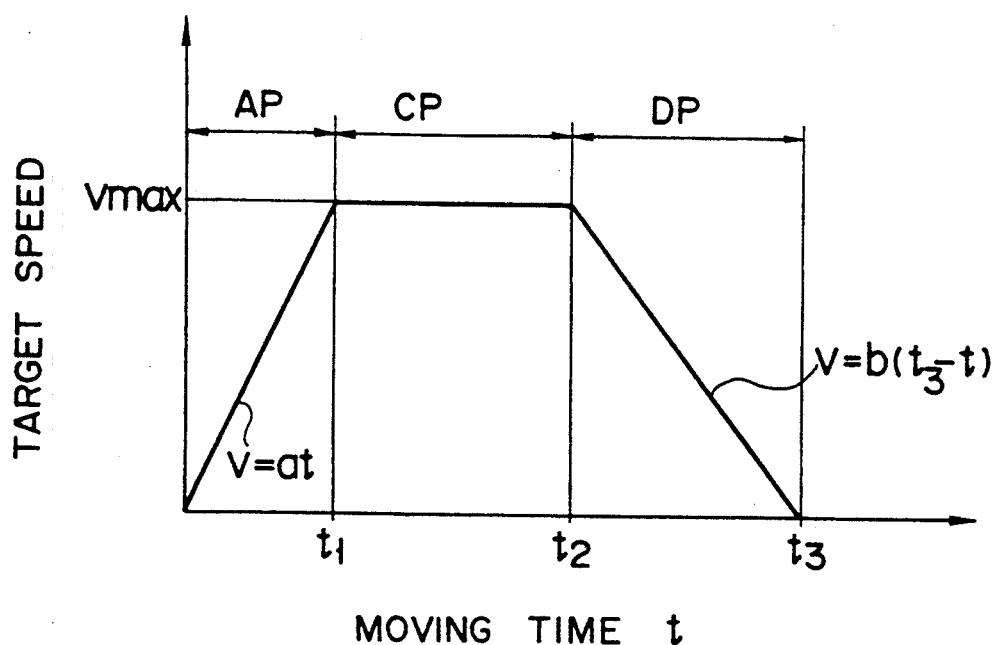
FIG. 1 is a view showing the relationship between the moving time and target speed of a magnetic head.
Figure 2:
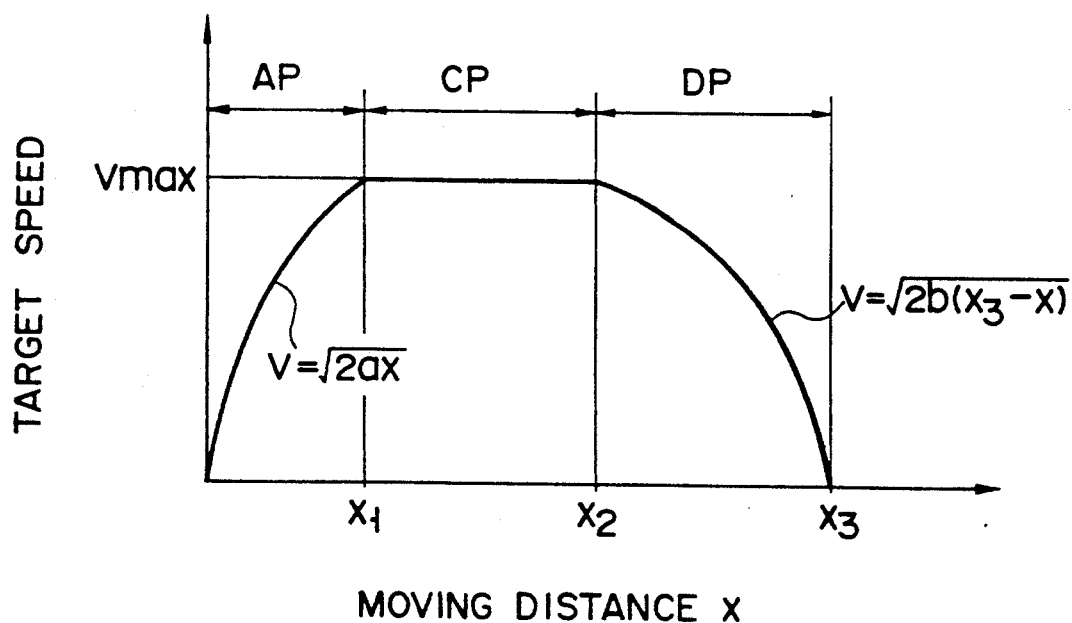
FIG. 2 is a view showing the relationship between the moving distance and target speed of the magnetic head.

Speed control for moving a magnetic head of a magnetic disk drive to a target track and track following control for positioning the magnetic head in the center of the target track have been used as positioning control of the magnetic head. In the speed control, a target speed corresponding to a distance by which the magnetic head moves to the target track is preset, drive control of a voice coil motor for moving a carriage supporting a magnetic head is performed so as to make the actual moving speed coincident with the preset target speed. A target speed curve, which is a function of the moving time or moving distance of the magnetic head, is called a speed profile curve. The speed profile curve is shown in FIGS. 1 and 2. In these figures, a and b indicate positive acceleration and negative acceleration, respectively. The moving speed of the magnetic head is controlled during acceleration period AP, constant speed period CP and deceleration period DP, as shown in FIGS. 1 and 2.

During the acceleration period AP, the magnetic head is accelerated at positive constant acceleration a (corresponding to the maximum acceleration) until the moving speed of the magnetic head reaches a target speed Vmax of the constant speed period CP. During the constant speed period CP, the target speed Vmax is maintained. During the deceleration period DP, the magnetic head is decelerated at negative constant acceleration b (corresponding to ¼ to ⅓ of the maximum acceleration).

As described above, the magnetic head moves to the target track by the speed control. When the magnetic head reaches the target track, the positioning control is changed from the speed control to the track following control. As shown in FIG. 3, Xz and Vz represent a position (a position shift amount from the center of the target track) and a moving speed of the magnetic head when the positioning control is changed from the speed control to the track following control, i.e., when the magnetic head reaches the target track. The position and the moving speed of the magnetic head is controlled like a transient response wherein a position Xz and a moving speed Vz of the magnetic head are provided as initial values. It is thus necessary to stably position the magnetic head at the center of the target track as soon as possible. In FIG. 3, Tw indicates a track width of the target track, and X indicates a state vector when the magnetic head reaches the target track. The state vector X is represented in the hard disk drive of a dedicated servo type (a recording medium for recording servo data is different from that for data read/write) wherein servo data can be always read out during the magnetic head moves, and the position of the magnetic head can be always detected.

FIG. 4 illustrates a model of the transient response shown in FIG. 3. The transient response X(s) in the transient response model (position Xz, moving speed Vz) is expressed by the following equation.

$$X(s) = (SXz + Vz)/(H(s) + S^2) \quad (1)$$

where r indicates a target track position, H(s) indicates a control system, 1/S indicates an integrating factor, and $1/S^2$ indicates a controlled object.

The transient response X(s) is thus represented as a sum of difference phase variations which an initial value is Xz and Vz. In order to shorten the transient response time and stabilize the transient response it is desirable that Xz and Vz is as small a possible and the transient response is stabilized for a short time. Since, however, the Xz generally depends upon the width of the track, the magnetic head needs to be positioned for a short time by decreasing Vz as much as possible and setting Vz to a constant value when only the transient response time is taken into consideration.

In a hard disk drive of a sector servo type, track address information as position data of the magnetic head and the moving speed of the magnetic head can be obtained only discretely, i.e., only every one sector time.

Accordingly, as shown in FIG. 5, during a deceleration period DP, when the magnetic head reaches the target track, i.e., when the track address information is read out from a servo area of a sector of the target track by the magnetic head and it is detected that the magnetic head reaches the target track, the position and moving speed of the magnetic head varies largely by the moving speed of the magnetic head and sample timing of servo data, as shown in FIG. 3. Note that in the sector servo type, when the track address information is read out from the servo area of the sector of the target track by the magnetic head and it is detected that the magnetic head reaches the target track, the position of the magnetic head corresponds to a position shifted from the center of the target track toward a position apart from the center of the target track by Tw, as shown in FIG. 3.

Assuming that track width Tw is 1.5 μm, acceleration b is $-80$ m/s$^2$, and one sector time Ts is 0.5 ms, a variation $\Delta Vn$ of the moving speed of the magnetic head and a variation $\Delta Xn$ of the position of the magnetic head when it reaches the target track are given as follows.

$$\Delta Vn = |b(Ts/2)| = 0.02 m/s$$

$$\Delta Xn = |b/2 \cdot (Ts/2)^2| = 2.5 \times 10^{-6} m = 2.5 \mu m$$

To suppress these variations, it is proposed that the negative acceleration of the speed profile curve is reduced directly before the magnetic head arrives at the target track. Assuming that in the deceleration period DP the remaining distance from the magnetic head to the target track is xr and the negative acceleration is b, the target speed V is represented by the following equation.

$$V = \sqrt{2bxr} \qquad (2)$$

Figure 6:
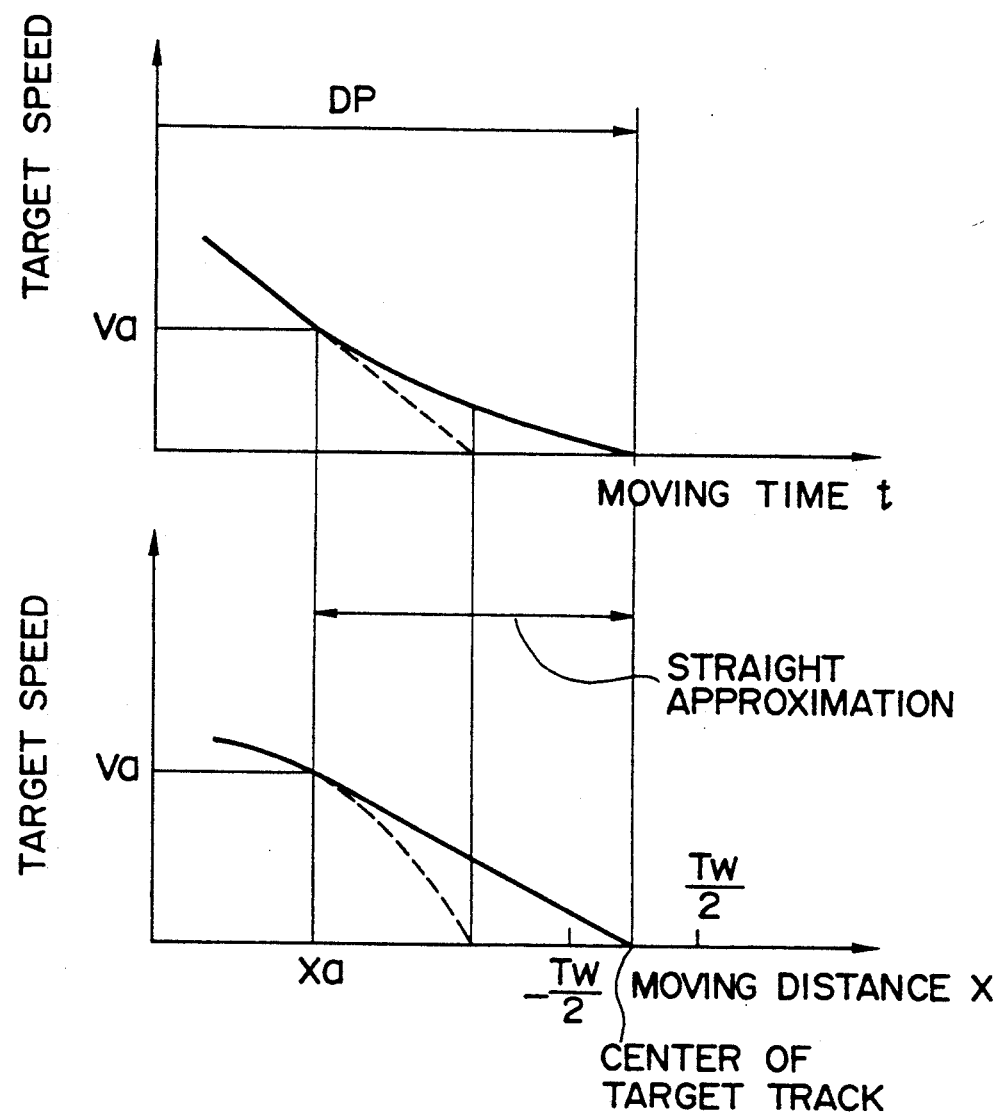
FIG. 6 is a graph showing the relationship between the target speed and the moving time/moving distance of the magnetic head using a linear approximation method.

A linear approximation method in which a target speed is set so as to be proportionate to the remaining distance xr from a predetermined position xa to the target track position, is used (see FIG. 6).

In this method, as shown in a solid line of FIG. 6, the rate of change in the target speed is gradually decreased by reducing the negative acceleration from the position xa to the target track. The target speed V in the linear approximation method is thus expressed by the following equation.

$$V = (Va/xa) \cdot xr \qquad (3)$$

The target reachable speed V0 at which the head has reached the target track, is given by the following equation.

$$V0 = (Va/xa) \cdot (Tw/2) \qquad (4)$$

Therefore, the predetermined position xa can be set so that the target reachable speed V0 has a necessary value.

Figure 7:
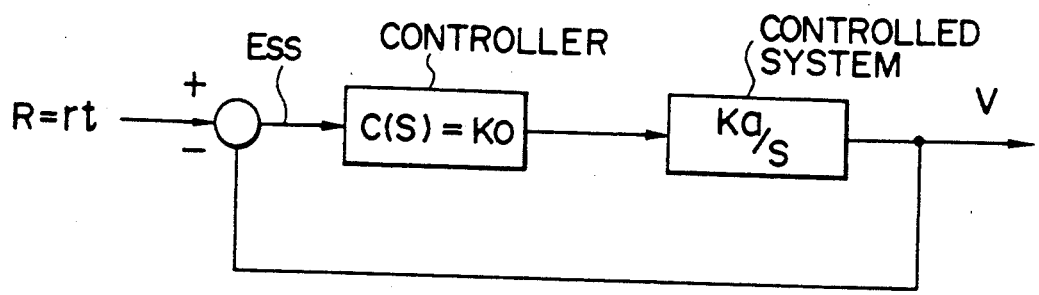
FIG. 7 is a view showing a continuous control model.
Figure 8:
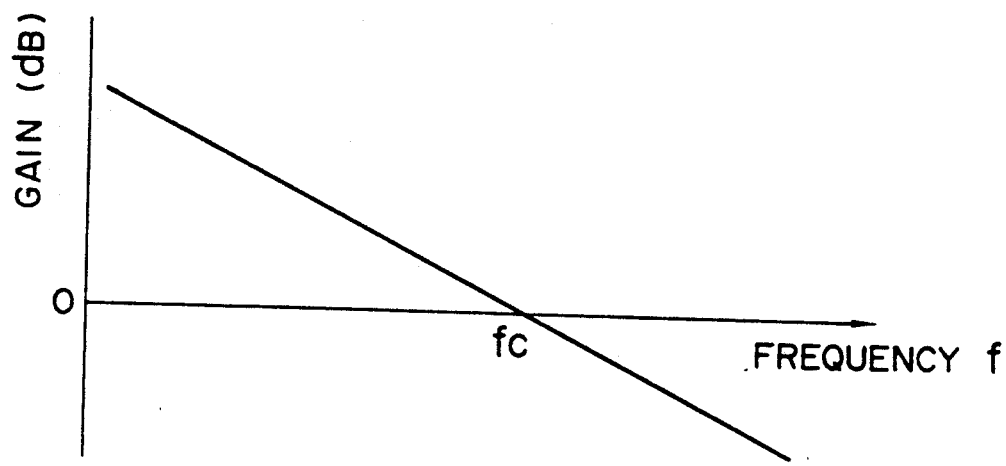
FIGS. 8 and 9 are views showing amplitude characteristics and phase characteristics of the continuous control model shown in FIG. 7.
Figure 9:
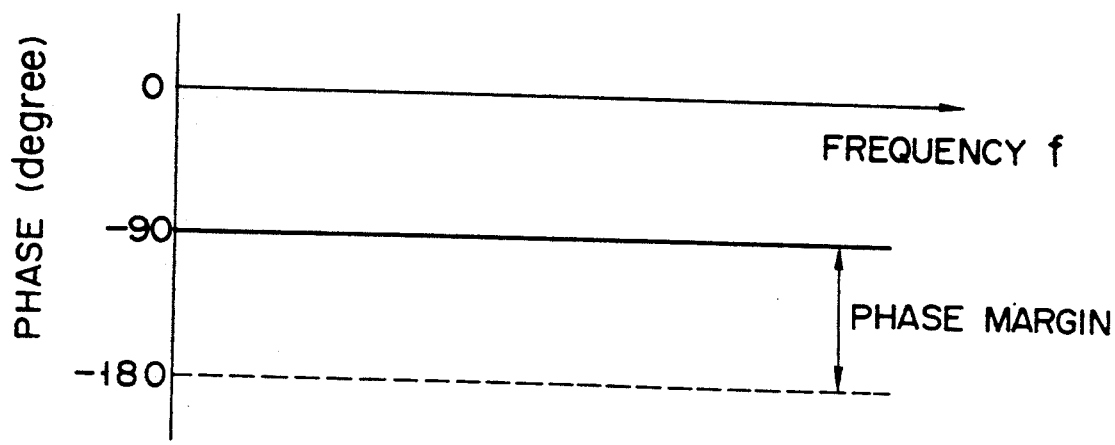

FIG. 7 shows a general model of continuous control, for example, control in which servo data is continuously acquired, such as a dedicated servo type (a recording medium for recording servo data is different from that for data read/write). In FIG. 7, K0 indicates a control gain. Since this control model is a primary model having a single polarity on the origin of an s plane, a steady-state error Ess always occurs on a lamp input signal (primary reference signal rt). In other words, since the lamp input signal is issued as a reference signal while the magnetic head is accelerating or decelerating, the steady-state error Ess occurs. In the control model shown in FIG. 7, the steady-state error Ess can be reduced as much as possible by increasing the control gain. The control model has a phase margin of 90 degrees without relying upon the gain. FIGS. 8 and 9 show the amplitude characteristics and phase characteristics in the continuous control model shown in FIG. 7. The steady-state error Ess is expressed by the following equation.

$$Ess = r/Kv \qquad (5)$$

$$Kv = \lim_{s \to 0} Ka \cdot C(s) \qquad (6)$$

Figure 10:
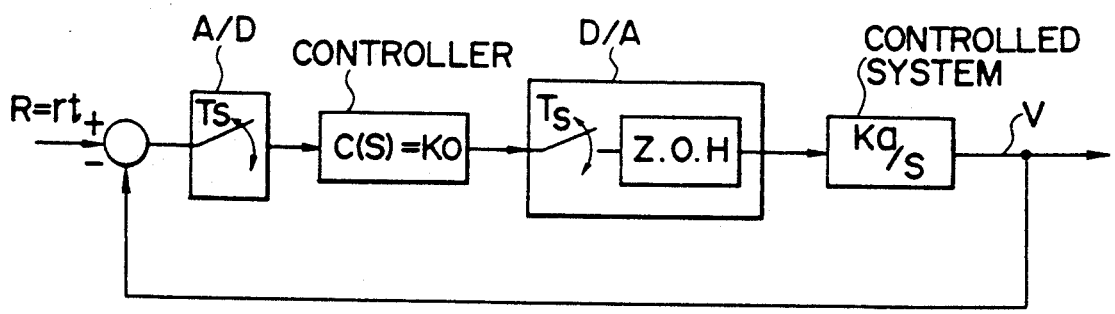
FIG. 10 is a view showing a discrete control model.
Figure 11:
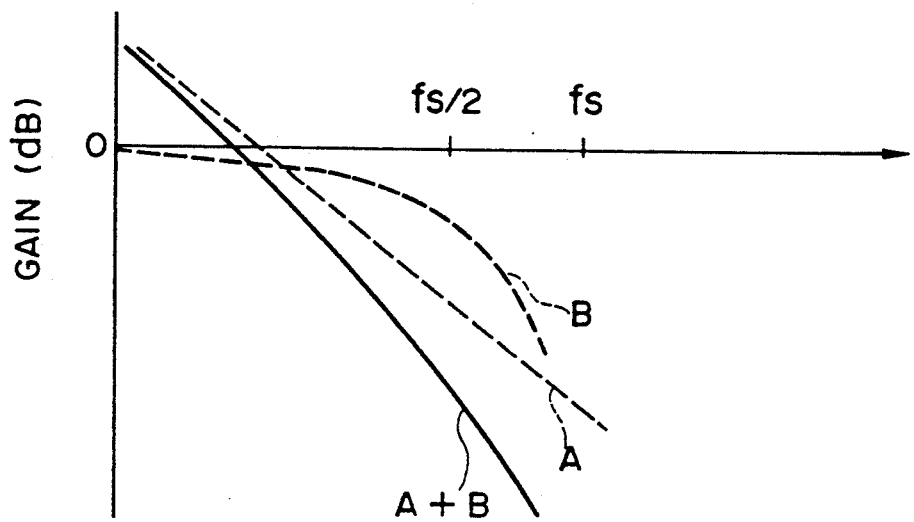
FIGS. 11 and 12 are views showing amplitude characteristics and phase characteristics of the discrete control model shown in FIG. 10.
Figure 12:
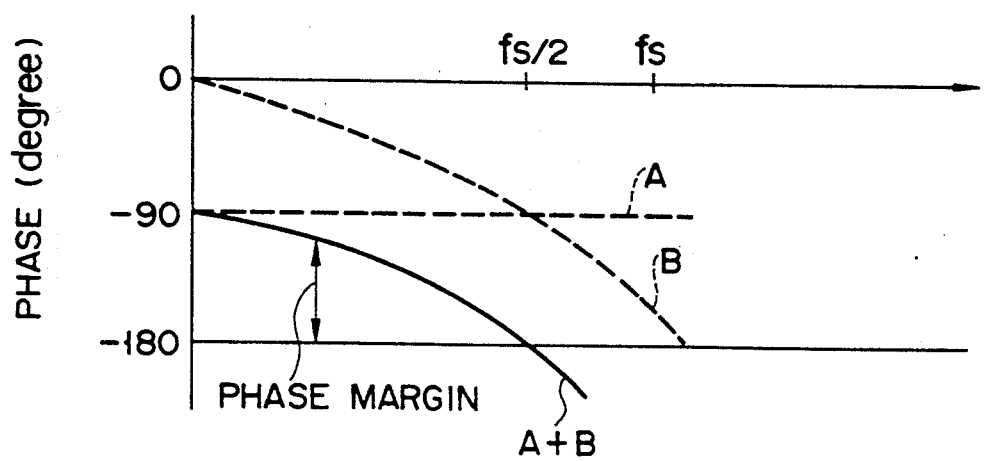

FIG. 10 illustrates a general model of discrete control of, e.g., a sector servo system in which servo data is discretely acquired. In the discrete control model, when a control gain is increased, that is, when a control bandwidth is broaden, a zero order hold (ZOH) circuit delays a phase within the control bandwidth. The phase margin of the control model is thus reduced, the speed of the magnetic head cannot be stably controlled and oscillated. The steady-state error and the control stabilization are therefore opposite to each other. FIGS. 11 and 12 show the amplitude and phase characteristics (A) of an object to be controlled, the amplitude and phase characteristics (B) of the ZOH circuit, and a combination of the characteristics (A+B) in the discrete control model shown in FIG. 10.

When the linear approximation method is used in the speed control of the sector servo type as described above, the negative acceleration is continuously decreased from a predetermined position to the target track during the deceleration period, that is, it is continuously decreased during the linear approximation period. When the control gain is set so that a high follow-up characteristic for a target speed can be obtained during the deceleration period during which the magnetic head decreases at the constant negative acceleration, the speed control becomes unstable during the linear approximation period. When the magnetic head reaches the target track, i.e., when the track address information is read out from a servo area of a sector of the target track by the magnetic head and it is detected that the magnetic head reaches the target track, the position (a distance which the magnetic head is shifted from the center of the target track) and moving speed are greatly changed. When the control gain is set so that the speed of the magnetic head can be controlled with predetermined precision during the linear approximation period, the follow-up characteristic for the target speed of the magnetic head is degraded during a period for the magnetic head reaches a desired position in the deceleration period. It is therefore difficult to optimize the control gain.

As described above, in the present invention, the control gain is changed in accordance with the rate of change in the target speed, namely, the negative acceleration during the deceleration period of speed control of the sector servo system, resulting in improvement and stabilization of speed control.

Embodiments of the present invention will be described.

Figure 13:
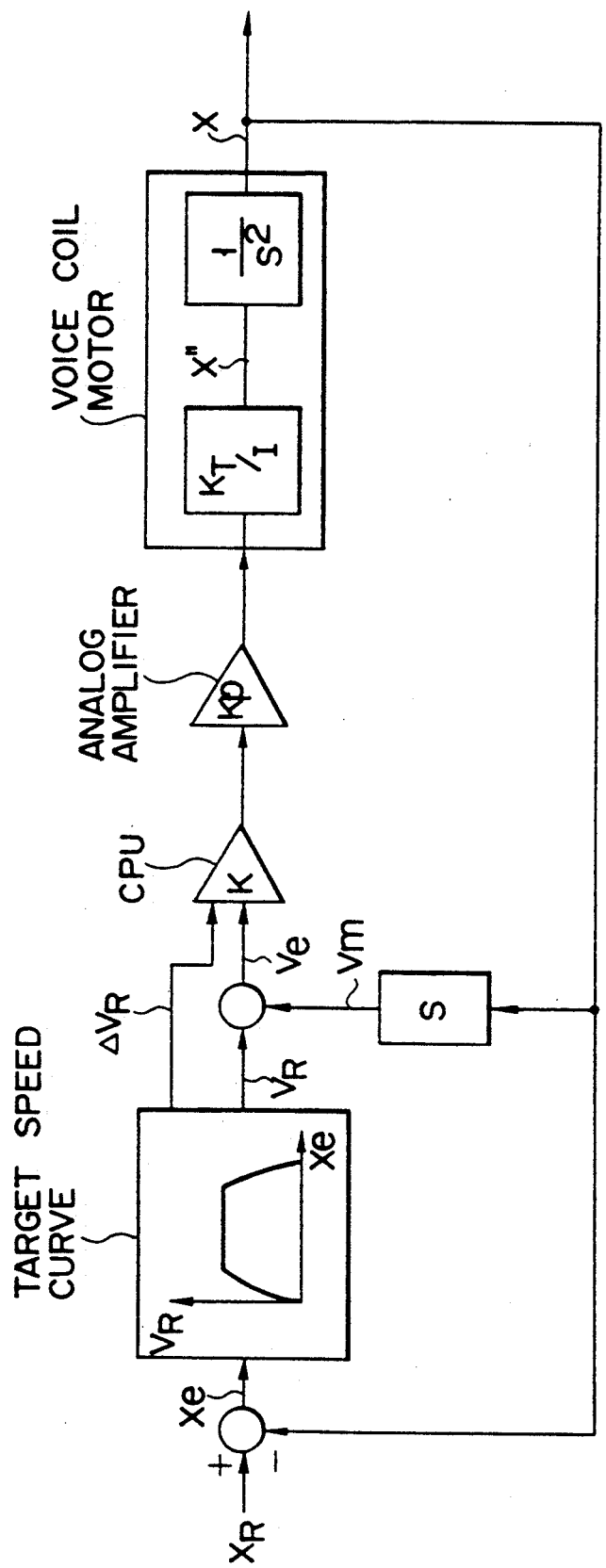
FIG. 13 is a view showing a speed control model according to the present invention.

FIG. 13 is a view showing a speed control model according to the present invention. In FIG. 13, a target speed VR is acquired from a target speed curve on the basis of a difference between a moving position x and a target position XR of a magnetic head, namely, on the basis of the remaining moving distance Xe. A central processing unit (CPU) changes a control gain K in accordance with a difference between the acquired target speed VR and moving speed Vm of the magnetic head, namely, a difference speed Ve and a changing rate of ΔVR in the target speed. For example, Kp is 80 mA/V, and KT/I is 1000 (m/s²)/A.

FIG. 14 is a block diagram showing the configuration of a magnetic head moving speed control apparatus 5 according to the first embodiment corresponding to the speed control model shown in FIG. 13. As shown in FIG. 14, the magnetic head moving speed control apparatus is applied to a hard disk drive of a sector servo type and comprises a recording medium 10, a magnetic head 11, an amplifier 12, a position detector 13, an analog/digital (A/D) converter 14, a CPU 15, a read-only memory (ROM) 16, a digital/analog (D/A) converter 17, a power amplifier 18, a voice coil motor (VCM) 19, and a carriage 25. The magnetic disk 10 is rotated by a spindle motor (not shown) in drive operation. The magnetic head 11 can be arranged on upper and lower sides of the magnetic disk 10 at an opposite position.

Servo data is prerecorded on each of sectors of the recording medium 10 such as a disk. The magnetic head 11, which records/reproduces data on/from the recording medium 10, moves on the recording medium 10 as the carriage 25 moves by driving the VCM 19. The amplifier 12 amplifies a reproduction signal from the magnetic head 11. The position detector 13 detects a track position (i.e., a track number) which the magnetic head exists, in accordance with track address information of the servo data included in the amplified reproduced signal, and outputs position data representing the detected track position to the CPU 15. The position detector 13 also outputs to an analog/digital (A/D) converter 14 an analog signal corresponding to a shift amount for the center of the track which the magnetic head exists, in accordance with the burst information of the servo data included in the amplified reproduced signal. The A/D converter 14 digital-converts the shift amount of the magnetic head for the center of the track in accordance with the analog signal and output a digital signal corresponding to the digital-converted shift amount to the CPU 15.

The CPU 15 controls the entire apparatus of the present invention and changes the gain in accordance with the rate of change in the target speed of the magnetic head 11. The ROM 16 stores speed data representing a speed profile curve (see FIG. 2) of the target speed corresponding to the moving distance of the magnetic head 11. The D/A converter 17 holds a control signal from the CPU 15 for a period of one sample time and converts the control signal into an analog signal. The power amplifier 18 amplifies the analog signal output from the D/A converter 17. The VCM 19 is driven by the control signal amplified by the power amplifier 18.

An operation of the CPU 15 will be described with reference to the flowchart shown in FIG. 15.

When a target track (cylinder) for reading/writing data is determined, the magnetic head 11 moves on the recording medium 10 toward the target track. During the movement of the magnetic head 11, servo data recorded on the recording medium 10 is read out by the magnetic head every one sector time. The read-out servo data is amplified by the amplifier 12 and then input to the position detector 13. The position detector 13 detects a track position (i.e., a track number) which the magnetic head exists, in accordance with track address information of the servo data included in the amplified reproduced signal, and outputs position data representing the detected track position to the CPU 15. The position detector 13 also outputs to an analog/digital (A/D) converter 14 an analog signal corresponding to a shift amount for the center of the track which the magnetic head exists, in accordance with the burst information of the servo data included in the amplified reproduced signal. The A/D converter 14 digital-converts the shift amount of the magnetic head for the center of the track in accordance with the analog signal and output a digital signal corresponding to the digital-converted shift amount to the CPU 15.

In step A1 of the flowchart shown in FIG. 15, the position data is received.

In step A2, a moving speed Vm of the magnetic head 11 is computed on the basis of the received position data. Since the position data is read out in order from the recording medium 11 every one sector time, the moving distance of the magnetic head is computed based on first track address information read out from a sector of a track on the magnetic disk which the magnetic head exists and second track address information read out before a desired period of time from the time which the first track address information is read out. A moving speed Vm of the magnetic head is obtained by dividing the computed moving distance into sample time (one sector time).

In step A3, the number of the remaining tracks is obtained from the current position of the magnetic head 11 and the position of the target track, and speed data representing a target speed VR at which the magnetic head 11 moves on the remaining tracks is read out in accordance with the speed data indicative of the speed profile curve stored in the ROM 16.

When the target speed VR of the magnetic head 11 is so computed, a difference or a difference speed between the target speed and the actual moving speed is computed, and a control signal is output from the CPU 15 in accordance with the difference speed. In the first embodiment, the speed of the magnetic head is controlled using the linear approximation method for a period of time (hereinafter referred to as a linear approximation period) corresponding to the interval between a predetermined position and the target track during the deceleration period, and the control gain is changed in proportionate to the rate of change in the target speed. The time changing rate in the target speed is decreased in a manner of exponential function when the magnetic head moves ideally.

In step A4, it is determined whether or not the remaining distance from the present position to the target track is not less than 15 tracks. If the remaining distance is not less than a predetermined number of tracks, e.g., 15 tracks, in other words, if the negative acceleration (changing rate ΔVR in target speed =ΔV0) is constant, e.g., 100 m/s² or more, the control gain is set to K0 (step A5). In step A6, a control signal u (=K0 (VR−Vm)) is produced by multiplying the control gain K0 by a difference speed and then output to the D/A converter 17 (step A10).

The control signal output from the CPU 15 is converted into an analog signal by the D/A converter 17, then input to the power amplifier 18. The voice coil motor 19 is driven by the control signal amplified by the power amplifier 18.

In step A4, when the remaining distance is less than 15 tracks, namely, during the linear approximation period, the speed of the magnetic head is controlled so that the negative acceleration (changing rate ΔVR in target speed=ΔV0) gradually decreases. In step A7, the changing rate ΔVR in the target speed is obtained in accordance with speed data representing the speed profile curve stored in the ROM 16. In step A8, the control gain K is computed by the following equation.

$$K = (\Delta Vs/\Delta V0)K0 \qquad (7)$$

As is apparent from the equation (7), the control gain changes with the ratio of $\Delta Vs$ and $\Delta V0$. $\Delta Vs$ gradually decreases during the linear approximation period, so does the control gain K. In step A9, a control signal u ($=K(VR-Vm)$) is produced by multiplying the control gain K by the difference signal and output to the D/A converter 17 (step A10). Since the control gain decreases in accordance with the changing rate in the target speed, the follow-up characteristics in the speed control can be improved.

It is desirable to continuously change the control gain in accordance with the changing rate in the target speed, as has been described above. Actually, however, the speed control is complicated. The CPU 15 of the speed control apparatus according to the first embodiment operates in accordance with the flowchart shown in FIG. 16.

Figure 16:
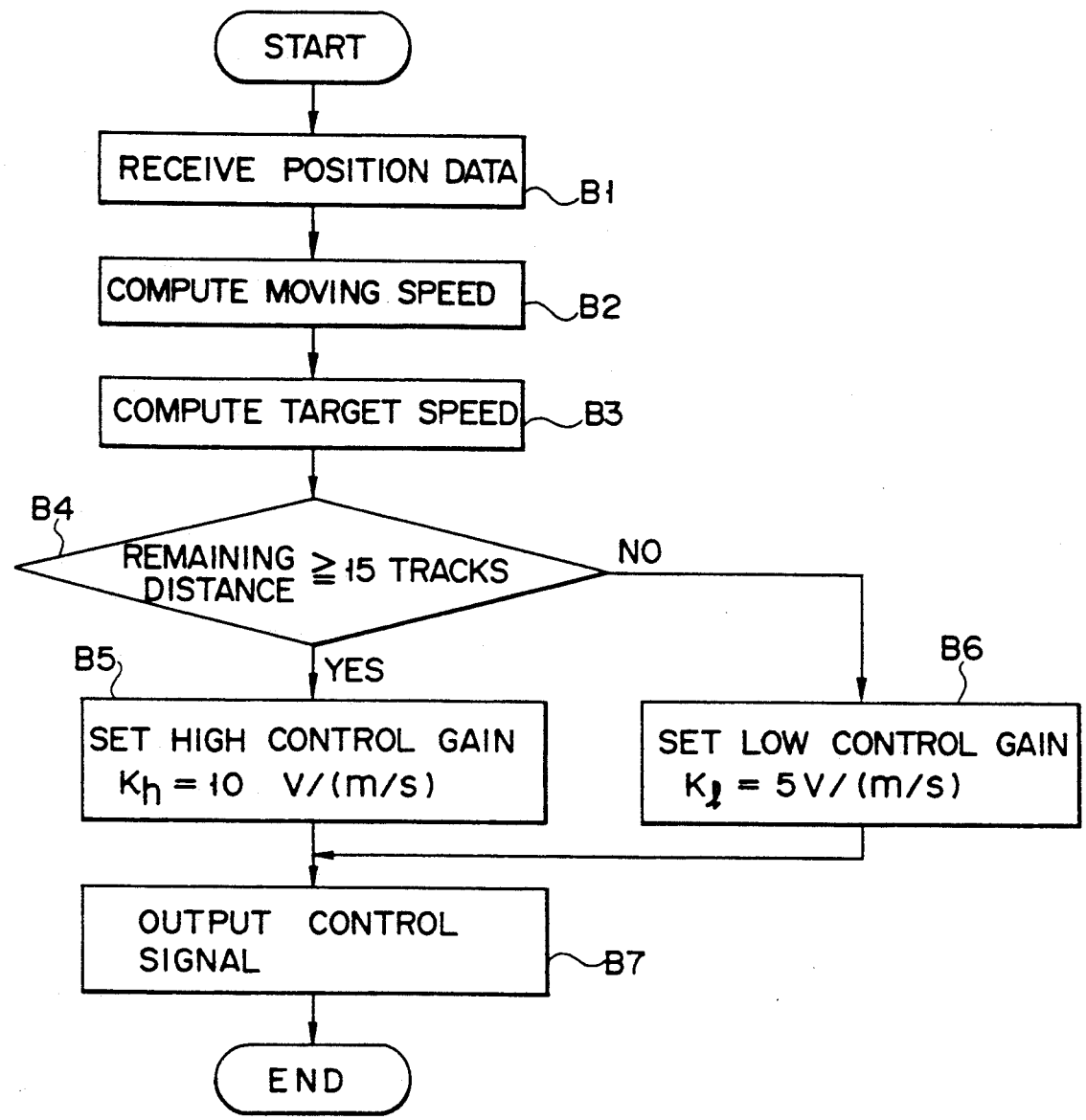
FIG. 16 is a flowchart showing a second operation of the moving speed control apparatus shown in FIG. 14.

In step B1 of the flowchart shown in FIG. 16, position data is received.

In step B2, a moving speed of the magnetic head 11 is computed based on the received position data.

In step B3, the number the remaining tracks is obtained from the current position of the magnetic head 11 and the position of the target track and, referring to speed data indicative of the speed profile curve stored beforehand in the ROM 16, a target speed necessary to move the magnetic head 11 is obtained from remaining tracks.

In step B4, it is determined whether the remaining distance from the current position to the target track is not less than 15 tracks. In step B4, if the remaining distance is not less than a predetermined number of tracks, e.g., 15 tracks, in other words, if the negative acceleration (changing rate in target speed) is 100 m/s$^2$, the control gain is set to a high control gain Kh ($=10$ V/(m/s)) (step B5). In this case, the changing rate in the target speed is constant. In step B7, a control signal is produced by multiplying the control gain Kh by a difference speed, and the produced control signal is output to the D/A converter 17.

The control signal output from the CPU 15 is converted into an analog signal by the D/A converter 17 and then input to the power amplifier 17. The voice coil motor 19 is driven by the control signal amplified by the power amplifier 18.

In step B4, when the remaining distance is less than 15 tracks, namely, during the linear approximation period, the speed of the magnetic head is controlled so that the negative acceleration (changing rate in target speed) gradually decreases. During the linear approximation period, however, the control gain is not changed continuously but set to a low control gain K1 ($=5V/(m/s)$) (step B6). In step B7, a control signal is produced by multiplying the control gain Kh by a difference speed and then output to the D/A converter 17.

The control gain is thus changed to two values in accordance with the rate of change in the target speed. The change in the control gain therefore improves the follow-up characteristics of the speed control.

If the control gain is so changed, a variation in the speed at which the magnetic head has reached the target track becomes less, and the transient response in the track following control is improved. Therefore, the magnetic head is stably moved and its moving time can be shortened.

Figure 17:
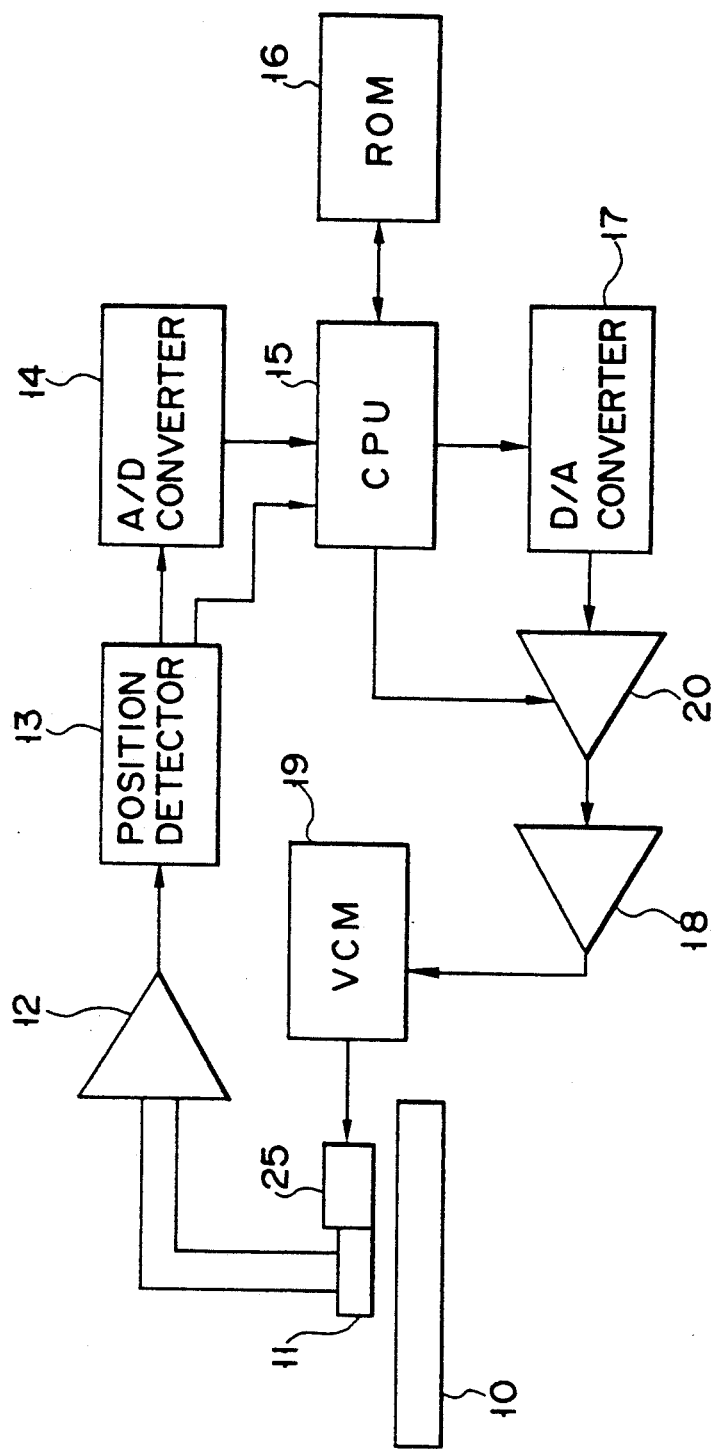
FIG. 17 is a block diagram showing a configuration of a moving speed control apparatus according to a second embodiment of the present invention.

In the speed control apparatus according to the first embodiment, the control gain is changed by the CPU 15. When a control signal of low gain is output, a quantization error of the D/A converter 17 increases and thus a variation in the target reachable speed at the magnetic head has reaches occurs. To reduce the variation, a magnetic head moving speed control apparatus according to the second embodiment shown in FIG. 17 is used.

In the apparatus according to the second embodiment, an analog amplifier 20 having a gain change function is arranged between the D/A converter 17 and power amplifier 18. The gain change of the analog amplifier 20 is performed by a gain change signal output from the CPU 15. With this configuration, in the apparatus according to the second embodiment, the control gain can be changed without increasing the quantization error of the D/A converter 17.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic recording and reproducing apparatus comprising:
    a recording medium in which servo data is recorded;
    head means for reading out the servo data from the recording medium;
    moving means for moving the head means over the recording medium;
    generating means for generating position data representing a current position of the head means in accordance with the read out servo data; and
    control and process means for obtaining a moving speed of the head means in accordance with the generated position data, obtaining a target speed corresponding a remaining distance between a target position and the current position of the head means in accordance with the generated position data, subtracting the moving speed from the target speed to acquire a difference speed, obtaining a changing rate of successive target speeds, changing the target speed from a desired timing to change the changing rate, changing a control gain in accordance with the changing rate, and producing a control signal by the acquired difference speed and the changed control gain, and
    wherein the moving means is controlled in accordance with the produced control signal.

2. The apparatus according to claim 1, wherein when the head means reaches a desired position during a period which the head means is decelerated, the target speed is decreased to decrease the changing rate and the control gain is decreased in accordance with the decreased changing rate.

3. The apparatus according to claim 1, wherein when the changing rate is smaller than a desired rate during a period which the head means is decelerated, the target speed is decreased to decrease the changing rate and the control gain is decreased in accordance with the decreased changing rate.

4. The apparatus according to claim 1, wherein the control and process means includes a central processing unit, and the control gain is changed by the central processing unit.

5. The apparatus according to claim 1, wherein when the remaining distance is smaller than a desired distance during a period which the head means is decelerated, the target speed is decreased to decrease the changing rate and the control gain is decreased in accordance with the decreased changing rate.

6. A magnetic recording and reproducing apparatus comprising:

a recording medium in which servo data is recorded;

head means for reading out the servo data from the recording medium;

moving means for moving the head means over the recording medium;

generating means for generating position data representing a current position of the head means in accordance with the read out servo data;

memory means for storing a plurality of target speed values representing a target speed corresponding to a remaining distance between a target position and the current position of the head means; and control and process means for obtaining moving speed value representing a moving speed of the head means in accordance with the generated position data, reading out the target speed value from the memory means in accordance with the generated position data, subtracting the moving speed value from the target speed value to acquire a difference speed value, obtaining a changing rate of successive target speed values, changing the target speed value by a desired timing to change the changing rate, changing a control gain in accordance with the changing rate, and producing a control signal by the acquired difference speed value and the changed control gain, and wherein the moving means is controlled in accordance with the produced control signal.

7. The apparatus according to claim 6, wherein when the head means reaches a desired position during a period which the head means is decelerated, the target speed is decreased to decrease the changing rate and the control gain is decreased in accordance with the decreased changing rate.

8. The apparatus according to claim 6, wherein when the changing rate is smaller than a desired rate during a period which the head means is decelerated, the target speed is decreased to decrease the changing rate and the control gain is decreased in accordance with the decreased changing gain.

9. The apparatus according to claim 6, wherein the control and process means includes a central processing unit, and the control gain is changed by the central processing unit.

10. The apparatus according to claim 6, wherein when the remaining distance is smaller than a desired distance during a period which the head means is decelerated, the target speed is decreased to decrease the changing rate and the control gain is decreased in accordance with the decreased changing rate.

11. A recording and reproducing apparatus comprising:

a recording medium having servo data;

a head;

moving means for moving the head over the recording medium;

generating means for generating position data representing a current position of the head in accordance with the servo data read out by the head; and control and process means for obtaining a difference speed representing a difference between a moving speed and a target speed in accordance with the generated position data, changing a changing rate of the target speed, changing a control gain in accordance with the changing rate, and producing a control signal by the acquired difference speed and the changed control gain to control the moving means.

* * * * *